United States Patent Office 3,432,558
Patented Mar. 11, 1969

3,432,558
ORGANIC CATALYTIC OXIDATION AND
CATALYSTS THEREFOR
Lloyd B. Ryland, El Cerrito, Calif., assignor to Shell
Oil Company, New York, N.Y., a corporation of
Delaware
No Drawing. Original application Jan. 12, 1960, Ser. No.
1,874, now Patent No. 3,380,931, dated Apr. 30, 1968.
Divided and this application Nov. 21, 1967, Ser. No.
708,454
U.S. Cl. 260—604      4 Claims
Int. Cl. C07c 45/04

ABSTRACT OF THE DISCLOSURE

Alpha, beta-unsaturated aldehydes are produced by reacting a monoolefin with oxygen in the presence of an oxidation catalyst consisting essentially of an oxide of a metal of the left hand column of Group VI of the Periodic System of the Elements, an oxide of bismuth is an amount corresponding to from about 1 to about 20 bismuth atoms per 10 atoms of said Group VI metal, and an oxide of arsenic in an amount corresponding to from about 0.1 to about 6 atoms of arsenic per 10 atoms of said Group VI metal.

This application is a division of application Ser. No. 1,874 filed Jan. 12, 1960, now Patent No. 3,380,931.

This invention relates to the selection oxidation of various organic materials capable of oxidation in the vapor phase with molecular oxygen through the aid of special oxidation catalysts as hereinafter specified. It relates more specifically to the use of special catalysts for such selective vapor phase oxidations and to the catalysts per se.

In the field of organic chemistry, as opposed to inorganic chemistry, oxidation reactions may be classified into 3 categories, namely (1) those in which one or more oxygen atoms are simply added to the molecule, (2) those in which at least 1 molecule of hydrogen is reacted to form a dehydrogenated product and formation of water, and (3) those in which both 1 and 2 occur.

In many cases these oxidations are effected in the liquid phase and/or at low temperatures with various oxidizing agents such as nitric acid, potassium permanganate, and the like. However, there are a number of such oxidations which are carried out in the vapor phase at relatively high temperatures e.g., above 500° C., with molecular oxygen through the aid of a solid oxidation catalyst and it is to the improvement of such oxidations that the process of the present invention relates. Examples of typical oxidations of this type are the oxidation of acetaldehyde to acetic acid, oxidation of methanol to formaldehyde, oxidation of acetylene to acetaldehyde, oxidation of benzene to maleic anhydride and fumaric acid, oxidation of toluene to benzaldehyde, oxidation of isopropyl alcohol to acetone, oxidation of propylene to acrolein, oxidation of isobutylene to methacrolein, oxidation of allyl alcohol to acrolein, oxidation of cinnamic alcohol to cinnamic aldehyde, oxidation of glycerol to glyceraldehyde, oxidative dehydrogenation of ethylbenzene to styrene, oxidative dehydrogenation of n-butylene to butadiene, oxidative dehydrogenation of methyl butenes to isoprene.

Many solid oxidation catalysts, including the oxides of iron, vanadium, manganese, silver, and copper have been used or suggested for carrying out these oxidation reactions; however, all of these catalysts leave something to be desired in the way of selectivity of action. In all of these cases where the oxidation is carried out with molecular oxygen at elevated temperatures a certain amount of the reactant and/or the desired reaction product is completely oxidized to carbon monoxide and carbon dioxide and this represents a substantial loss. By percent selectivity is meant the number of moles of desired product produced per 100 moles of reactant converted. Thus an ideal selectivity of 100% would mean that for each mole of reactant oxidized 1 mole of desired product would be produced. The selectivities are, however, much lower than this, for example half this theoretical value, in which case for every mole of reactant converted only 0.5 mole of the desired product is produced and the other 0.5 mole is converted to oxides of carbon or other by-products which generally are of little, if any, value and complicate the recovery of desired product from the reaction mixture.

A low selectivity is not only disadvantageous for these reasons but also from the operating standpoint. These oxidations are quite exothermic and even when the oxidation is selective there is difficulty in removing the heat and maintaining the desired reaction temperature. Non-selective oxidation to $CO_2$ is even more exothermic and greatly adds to the problem. As will be later shown even a small percentage increase in the selectivity considerably reduces the heat load.

It is now found that arsenic is a particularly useful component of one specific type of catalyst useful for this class of oxidation reactions in that its inclusion in the catalyst allows the selectivity of action to be materially improved.

The catalysts of the specific type mentioned have two essential components which are, namely (1) an oxide of bismuth and (2) an oxide of a metal of the left hand column of Group VI of the Periodic Table of the Elements (H. D. Hubbard—published by W. M. Welch Manuf. Co.—1950 Ed). Of these tungsten and molybdenum, and especially the latter, are the preferred elements. Bismuth oxide alone exerts very little catalytic oxidative characteristics and affords exceedingly low conversions and poor selectivity. Molybdenum oxide, the preferred second constituent, has a higher catalytic oxidation ability but affords very low selectivity, converting large amounts of the reactant to carbon dioxide and other worthless products. The combination of oxides of bismuth and those of the metals of Group VI, on the other hand, afford a useful range of oxidative activity and selectivity. The atomic ratios of bismuth to Group VI metal affording this enhanced effect lie between about 1 to 25, preferably between 1 to 15 atoms of bismuth per 10 atoms of molybdenum or other of the mentioned Group VI metals.

It is found that the incorporation of a minor amount of arsenic materially improves the selectivity of this type of oxidation catalyst for the mentioned type of catalytic oxidation process. The amount of arsenic to be incorporated corresponds to between about 0.1 to about 6 atoms of arsenic per 10 atoms of the Group VI metal. It is not to be inferred, however, that the arsenic is solely effective in modifying the oxidation ability of the Group VI metal oxide.

It is also found that in the combination of bismuth oxide and Group VI metal oxide for the type of catalytic oxidation in question the bismuth may be substituted up to about 50 atomic percent with one or more of the elements lead, silver, tin, and manganese.

The catalyst may also contain phosphorus, silicon, boron and/or sulfur in any amounts up to about 5 atoms per 10 atoms of the Group VI metal. Thus, for example, instead of using the oxides of the Group VI metals the heteropolyacids with phosphorus, silicon and/or boron may be used in preparing the catalysts e.g., the phospho- and silico-heteropolyacids of the Group VI metals may be used.

The oxidation states of the three essential metals in the catalyst are not known but the amount of combined oxygen in the catalyst is undoubtedly a function of the oxidation potential of the environment during use of the catalyst i.e., the amount of free oxygen present in the reaction zone, and may vary within limits according to the ratio of the oxygen to reactant. This later ratio is normally from about one-third to three times the stoichiometric ratio for the desired reaction.

Also while the components of the catalyst are spoken of as the oxides of the metals it will be understood that interactions between the oxides may take place causing the formation of compounds and/or solid solutions.

The catalyst may consist of the active metal oxides or it may contain these active metal oxides in combination with a support or relatively inert diluent material. Any relatively inert refractory support may be used; however, the preferred carriers are those having a relatively large volume of pores of relatively large size such, for instance, as sintered or bonded aggregates of silica sand, corundum, silicon carbide, or pumice, broken fire brick, and the like. These materials have pores of several hundred Angstroms or more average diameter. While it is desirable to incorporate large amounts e.g., at least 15% by weight of the active promoter in the supported catalyst it is also desirable to fill only a portion of the pore volume of the support, e.g., 25% or less. Prior to use the support is advantageously leached thoroughly with hot nitric acid and/or calcined at a quite high temperature e.g., 1000° C.

A relatively inert filler or binding agent in an amount up to about 50% by weight of the catalyst may be included. Suitable materials are, for example, colloidal silica, ball clay, graphite and the like.

It is found that the 100% active material without any filler or support generally gives the highest selectivity and that a small but definite loss in selectivity accompanies the use of supports and diluents. The inclusion of the arsenic offsets this loss.

CATALYST PREPARATION

The catalysts may be prepared by any suitable method. By way of specific examples three general methods are illustrated.

Method 1.—A suitable porous support is first impregnated with the desired amount of a soluble arsenic salt, e.g., ammonium arsenate and then dried. The arsenic-containing support is then impregnated with a concentrated solution of bismuth nitrate and phosphomolybdic acid e.g., 45% $Bi(NO_3)_3 \cdot 5H_2O + 3\%$ $HNO_3$
$+18\%$ $P_2O_5 \cdot 24MoO_3 \cdot 65H_2O$ The impregnation is carried out by immersing the support granules in the latter solution and alternately applying vacuum and pressure to fill all the pores of the support with solution. The concentrations of the various ingredients are adjusted to obtain both the desired Bi:As:Mo ratio and the amount of ultimate catalytic material on the support. After the impregnation the excess solution is drawn off, and the impregnated support is exposed to ammonia vapor by placing in a sealed container over, but not in contact with, concentrated ammonium hydroxide; this latter step may require some hours. Drying is again carried out at 120° C.; following this the impregnated support is muffled 1 hour at 300° C., and 2½ hours at a temperature exceeding that of the expected catalyst operation (e.g., 500° C.). By this method high concentrations of the active promoters may be incorporated. A second similar impregnation may be employed if still higher percentage of catalytic materials is required on the carrier.

Method 2.—Suitable salts of the metals, e.g., phosphomolybdic acid and bismuth nitrate and ammonium arsenite are dissolved in water in moderately high concentrations and the solutions are mixed to afford the metals in the desired atomic ratios. If desired thermally decomposable salts of the other mentioned metals may be added in various proportions and amounts at this time.

The mixed salt solution is added to a deionized silica sol (e.g. Ludox) the amount of silica being, for example, about 30% based on the final catalyst weight. The mixture is then thickened by heating with good stirring and dried to a solid at 120° C. The cake is broken up to the desired particle size and calcined for 6 hours at 538° C.

Method 3.—In another alternative method developed by W. E. Armstrong a solution of the ammonium salt of the Group VI acid e.g., ammonium molybdate, is added to a nitric acid solution of bismuth nitrate and then the mixture is hydrolyzed by the addition of ammonium hydroxide. The composition of the resulting precipitate depends upon the final pH—the higher the final pH the larger the atomic ratio of Bi to Group VI metal. The precipitate is filtered and washed. A solution of the desired amounts of arsenic is added and the mixture then dried and calcined.

The arsenic may be incorporated in the catalyst along with the other metal components. It is frequently desirable, however, to incorporate the arsenic by a separate impregnation step. Thus the carrier may be first impregnated with a soluble arsenic compound and then the other metals; or the other metals may be first incorporated e.g., by impregnation, followed by a second impregnation with a soluble arsenic compound e.g., arsenous acid, or arsenic acid.

During use there is, in some cases, a tendency for some of the arsenic to be removed from the catalyst with the reaction vapors. To prevent depletion of the catalyst of arsenic the preheated reactant vapor mixture may be passed through a bed of heated arsenic or arsenic compound having a low vapor pressure. In this way arsenic is supplied to the catalyst at substantially the same rate that it is lost from the catalyst.

The catalyst may be employed in the form of compressed pills, crushed fragments, or in the form of a powder. For example, the active metal oxides may be incorporated in the pores of an inert porous carrier and disposed as a fixed bed in a suitable reaction zone provided with cooling means to remove the exothermic heat of reaction.

The oxidations are carried out at temperatures upward of about 300° C., e.g., up to about 600° C. The pressure is normally around atmoshperic e.g., 10 to 100 p.s.i.a., but may be higher if desired. The gaseous hourly space velocity, which is defined as the moles of reactant to be oxidized, measured as a vapor under standard conditions of temperature and pressure passed in contact with a unit volume of the catalyst bed per hour, may vary from about 100 up to 3000 or even higher in some cases.

Generally the amount of oxygen supplied is at least the stoichiometric quantity and usually it is somewhat higher, e.g., up to 3 or 4 times the stoichiometric amount. In such cases unused oxygen is found in the reaction mixture. The oxygen e.g., in the form of air, may be supplied with the fresh feed to the reaction zone, or it may be introduced into the reaction zone separately in one or a plurality of places.

The oxidized products may be recovered from the reactor effluent in the conventional ways and any unreacted reactant may be recycled. In most cases, however, it is possible to obtain substantially complete conversion in a single pass without sacrificing selectivity of action.

The arsenic-containing catalysts of the composition described are useful for the oxidations of the type in question. These include the oxidation of acetylanes, olefins, diolefins, alkyl aromatics, alcohols, aldehydes, furans, alkylthiophenes, terpenes, and many of their analogues having common substituted groups. While the catalysts are useful in the oxidation of these materials it will be appreciated that they are, however, not equivalent and some are better than others for any particular case. For example, the catalyst having as its active component $Bi_1As_{0.3}W_3O_x$ is quite inferior in the oxidation of isobutylene to methacrolein but gives excellent results in the oxidation of n-butene to butadiene.

In the following examples the catalysts were prepared and tested in various vapor phase oxidation reactions with molecular oxygen. In the interest of brevity and to permit ready comparisons only the test results of the catalysts in the oxidation of propylene to acrolein and the oxidation of n-butene to butadiene will be given.

Example I

The catalysts shown in the following Table I were prepared by method 2 above. They were tested in a standardized test procedure for the oxidation of propylene to acrolein. In this test the reaction mixture consists of $\frac{1}{6}$ propylene, $\frac{1}{6}$ oxygen and the balance inert gas. The total flow rate is 150 cc./min. at temperatures generally about 460° C. Under these conditions the standard catalyst used for comparison affords at 460° C. a 41% conversion with 74% selectivity. This standard catalyst has the composition $Bi_1Mo_1$ and is prepared as follows:

Phosphomolybdic acid (31.6 gm.) was stirred with 30 ml. $H_2C$ which was warmed up to aid in the solution. To this was added a solution containing 4 ml. concentrated $HNO_3$, 40 ml. $H_2O$, and 58.2 gm. $Bi(NO_3)_3 \cdot 5H_2O$. This mixture was then added to 73 gm. Ludox that had been previously contacted with Nalcite HCR exchanger to remove sodium. After standing about an hour, the mixture was thickened by heating with constant stirring. It was then dried at 120° C., broken to 10–20 mesh, and muffled 6 hours at 538° C.

TABLE I

| Catalyst | Composition[1] | Conv., percent | Select., percent |
|---|---|---|---|
| 1 | $Bi_7As_1P_1Mo_{12}$ | 31 | 81 |
| 2 | $Bi_6As_2P_1Mo_{12}$ | 23 | 81 |
| 3 | $Bi_4As_4P_1Mo_{12}$ | 12 | 85 |
| 4 | $Bi_8As_2P_1W_6Mo_6$ | 37 | 69 |
| 5 | $Bi_8As_1P_1Mo_5$ | 38 | 80 |
| 6 | $Bi_4Pb_3As_1P_1Mo_{12}$ | 19 | 73 |
| 7 | $Bi_4Pb_3As_1P_1Mo_{2.5}$ | 30 | 81 |
| 8 | $Bi_8As_1P_1W_4Mo_5$ | 45 | 79 |
| 9 | $Bi_5Ag_2As_1P_1Mo_{12}$ | 44 | 77 |
| 10 | $Bi_5Ag_2As_1P_1W_6Mo_6$ | 37 | 68 |
| 11 | $Bi_8As_2P_1Mo_5$ | 25 | 84 |
| 12 | $Bi_5Ag_2As_1P_1Mo_3$ | 30 | 65 |

[1] $SiO_2 = 30\%$.

Example II

A catalyst having the active metals in the atomic ratio of $Bi_{20}As_1P_{1.7}W_{20}$ was prepared using bismuth nitrate. ammonium arsenite and phosphotungstic acid by the above described method 3 (final pH 5.6). This catalyst was quite active but gave relatively poor selectivity in the standard test for the oxidation of propylene to acrolein. However when used in a standard test for the oxidation of n-butylene to butadiene it afforded 85% selectivity at 70% conversion.

This standard test is similar to the propylene test except that an equal volume of n-butylene vapors is substituted for the propylene. The standard catalyst for comparison gives in this test 70% selectivity at 59% conversion (470° C.).

The catalyst No. 7 of Table I gave in the standard butadiene test a selectivity of 83% at 60% conversion (460° C.).

That even a few percent improvement in selectivity is of practical importance will be seen from the following comparison. Three unsupported catalysts having the compositions shown in Table II were prepared in essentially the same way and tested in the standard butadiene test. These catalysts covered a considerable range of selectivities in this reaction and consequently the heats of reaction varied. The conversions, selectivities and heat releases are given in the following Table II.

TABLE II

| Catalyst composition | Conv., percent | Select., percent | Heat release[1] |
|---|---|---|---|
| $Bi_1W_1$ | 66 | 78 | 90 |
| $Bi_1Mo_1$ | 70 | 84 | 48 |
| $Bi_7As_1Mo_7$ | 75 | 89 | 45 |

[1] K Cal/mole $C_4H_8$ reacted.

Example III

This example illustrates a trend that has been repeatedly noted. Three catalysts were prepared in essentially the same manner, namely, the above described precipitation technique (method 3) wherein the reaction mixture is brought to approximately neutral by the addition of ammonium hydroxide. The composition of the first catalyst was $Bi_1Mo_1$. The composition of the second was the same except that about 8% colloidal silica was included as a diluent-binder. The composition of the third was the same as the second except that arsenic was included in the proportion $Bi_{16}As_1Mo_{16}$. In the standard acrolein test these catalysts gave the results shown in the following Table III.

TABLE III

| Catalyst compositions | Conv., percent | Select., percent |
|---|---|---|
| $Bi_1Mo_1$ | 43 | 89 |
| 92% $Bi_1Mo_1$/8% $SiO_2$ | 36 | 71 |
| 92% $Bi_{16}As_1Mo_{16}$/8% $SiO_2$ | 17 | 83 |

It will be noted that the inclusion of the silica lowered the selectivity whereas the inclusion of the arsenic substantially restored the loss. The somewhat lower activity is of no importance since the heat release per unit volume of catalyst is so high that in practical operation the catalyst would be physically diluted with inert material in any case, e.g., by mixing equal volume of the catalyst particles and glass beads.

Example IV

This example illustrates the preparation of an arsenic promoted catalyst with a special silica support prepared by the slow coagulation of a silica sol. A 30% silica sol (Du Pont Ludox) was diluted with water. Ammonium nitrate was added to hasten growth of the sol. The pH was adjusted to 9.5 with ammonium hydroxide and the sol aged at 120° C. for about 3 days. The resulting solid gel was washed and dried. This product had area of about 169 m.²/g. and a pore volume (measured by water uptake) of about 1.66 cc./g.

This carrier was impregnated first with ammonium arsenite and dried. It was then impregnated with a concentrated solution of bismuth nitrate and phosphomolybdic acid by method 1. The total active promoters in the catalyst amounted to about 42% and were present in the ratios of $Bi_{12}As_{0.4}Mo_{12}$. In spite of this high concentration of promoter the promoter occupied only about 5% of the original pore volume.

In the standard acrolein test the catalyst gave 80% selectivity at 47% conversion.

Example V

A supported catalyst having the promoter elements in the ratio $Bi_{12}As_3P_1Mo_{12}$ was prepared by impregnating the carrier with a solution of the metal components and exposing to vapors of ammonia according to method 1 above.

The carrier in this case consisted of granules of a bonded diatomaceous earth (Celite VIII) having a pore volume (measured by water absorption) of 0.56 cc./g., a surface area of about 3–10 m.²/g. and containing besides silica small amounts of $Na_2O$, CaO, MgO, $Al_2O_3$ and $Fe_2O_3$. Prior to use this carrier was heated to near boiling for one hour in 1:4 diluted nitric acid and then thoroughly washed until the washings were free of acid. After drying at 120° C. this carrier was impregnated with the promoters. The finished catalyst contained about 42% of active ingredients but still retained about 95% of the pore volume.

In the standard acrolein test this catalyst gave 80% selectivity at 30% conversion.

Example VI

A supported catalyst having the composition 18% $Bi_{12}As_{2.3}P_1Mo_{12}/82\%$ support was prepared by the above described impregnation technique. The carrier used was a special bonded corundum material (designated Norton SA–101 Alundum) having about 20% porosity.

In the standard butadiene test the catalyst gave 90% selectivity at 48% conversion.

Example VII

This example shows the effect of the concentration of arsenic. Four unsupported catalysts were prepared by the described precipitation technique (method 3). They differed only in the amounts of arsenic included. The compositions and results in the standard acrolein test are given in the following Table IV.

TABLE IV

| Catalyst composition | Conv., percent | Select., percent |
|---|---|---|
| $Bi_{20}As_1Mo_{20}$ | 20 | 87 |
| $Bi_7As_1Mo_7$ | 22 | 87 |
| $Bi_3As_1Mo_3$ | 24 | 90 |
| $Bi_2As_1Mo_2$ | 17 | 88 |

Example VIII

A catalyst having the composition $Bi_{10}As_1P_1Mo_{10}$ was prepared by the described precipitation technique (method 3). In the standard acrolein test this catalyst afforded a selectivity of 90% and a conversion of 34%. In the standard butadiene test it afforded a 90% selectivity with 73% conversion (460° C.).

Example IX

A series of four supported catalysts was prepared by suspending the support in the solution during hydrolysis 3). The first catalyst had the composition 27% $Bi_{12}P_1Mo_{12}/73\%$ support The other catalysts were similar but contained arsenic. Their compositions are shown in Table V. The support in all of these was Alundum grade LA–623 having a surface area of about 5–10 m.²/g. and about 40% pore volume.

In catalysts 1 and 2 the support was used in the as received condition. In catalysts 3 and 4 the support was first drastically calcined at 1000° C. before impregnation.

In the standard acrolein test these catalysts gave the results shown in the following Table V.

TABLE V

| No. | Catalyst composition | Conv., Percent | Select., Percent |
|---|---|---|---|
| 1 | 27% $Bi_{12}P_1Mo_{12}/73\%$ support (470° C.) | 47 | 47 |
| 2 | 33% $Bi_{12}As_2P_1Mo_{12}/67\%$ support (460° C.) | 35 | 60 |
| 3 | 24% $Bi_{12}As_2P_1Mo_{12}/76\%$ support (460° C.) | 24 | 64 |
| 4 | 34% $Bi_{12}As_2P_1Mo_{12}/66\%$ support (460° C.) | 33 | 78 |

Although these catalysts did not give as selective oxidation as some others, the series illustrates (1) the beneficial effect of the arsenic, (2) the beneficial effect of the high temperature calcination of the carrier and (3) the desirability of having a relatively high concentration of active promoter in the carrier.

Example X

A series of four supported catalysts was prepared by the above mentioned impregnation technique (method 1) using as a carrier a bonded diatomaceous earth known as Celite 408. This material as received had the following properties:

Surface area _____m.²/g__ 2.4
Porosity (by water) _____cc./g__ 0.55
Packed density _____lb./ft.³__ 36

If used in the as received condition the resulting catalyst is inferior. Prior to use the material was treated with nitric acid and washed and dried as in Example V.

In the standard acrolein test (490° C.) the catalysts gave the results shown in the following Table VI.

TABLE VI

| No. | Composition | Conv., Percent | Select., Percent |
|---|---|---|---|
| 1 | 30% $Bi_{12}As_2P_1Mo_{12}/70\%$ support | 45 | 81 |
| 2 | 40% $Bi_{12}As_2P_1Mo_{12}/60\%$ support | 44 | 83 |
| 3 | 24% $Bi_{12}P_1Mo_{12}/76\%$ support | 32 | 75 |
| 4 | 25% $Bi_{12}As_2P_1Mo_{12}/75\%$ support | 32 | 86 |

These results again show the pronounced beneficial effect of the arsenic and the desirability of incorporating a high concentration of active promoter in the carrier.

Example XI

Two comparable supported catalysts were prepared by the described impregnation technique using as a carrier a naturally bonded diatomaceous earth designated Celite CCCV. This carrier was treated with nitric acid as described in Example V before use. The catalysts differed in that one contained arsenic and the other did not. The compositions and results obtained in the standard acrolein test (460° C.) are shown in the following Table VII.

TABLE VII

| No. | Catalyst compositions | Conv., Percent | Select., Percent |
|---|---|---|---|
| 1 | 43% $Bi_{12}P_1Mo_{12}/57\%$ support | 48 | 62 |
| 2 | 41% $Bi_{12}As_2P_1Mo_{12}/59\%$ support | 29 | 85 |

The beneficial effect of the arsenic is quite evident. Also by comparison of the results with catalyst No. 1 with those obtained with the standard catalyst an example of the general trend towards loss of selectivity by the incorporation of a carrier or diluent is seen.

Example XII

For purposes of comparison the compositions and acrolein test results (460° C.) of a series of catalysts in which part of the bismuth is substituted by other metals are shown in the following Table VIII.

TABLE VIII

| No. | Composition | Conv., Percent | Select., Percent |
|---|---|---|---|
| 1 | $Bi_8Mn_4P_1Mo_8/30\%$ $SiO_2$ | 29 | 83 |
| 2 | $Bi_8Mn_9P_1Mo_8/30\%$ $SiO_2$ | 11 | 47 |
| 3 | $Bi_4Sn_4Mn_4P_1Mo_8/30\%$ $SiO_2$* | 31 | 75 |
| 4 | $Bi_4Pb_4Mn_4P_1Mo_8/30\%$ $SiO_2$* | 29 | 63 |
| 5 | $Bi_4Pb_4Mn_4P_1Mo_8/30\%$ $SiO_2$ | 15 | 27 |
| 6 | $Bi_8Mn_4Mo_8/30\%$ $SiO_2$ | 29 | 83 |
| 7 | $Bi_8Mn_8P_1Mo_8/30\%$ $SiO_2$ | 34 | 75 |
| 8 | $Bi_8Mn_{12}P_1/30\%$ $SiO_2$ | 29 | 0 |
| 9 | $Bi_8Mn_4P_1Mo_8/50\%$ $SiO_2$ | 20 | 69 |
| 10 | $Bi_8Mn_4P_1Mo_8/75\%$ $SiO_2$ | 33 | 67 |

In each case the silica was incorporated in the form of a colloidal silica sol. In those cases marked with an asterisk (*) manganese acetate was used in the preparation; in the other cases manganese sulfate was used. The catalysts were prepared by the method 2 described above. The selectivities of those catalysts, except catalyst number 8, may be improved by incorporating the prescribed amounts of arsenic.

I claim as my invention:

1. The process for the production of an unsaturated aldehyde selected from the group consisting of acrolein and methacrolein consisting essentially of reacting an olefinic hydrocarbon selected from the group consisting of propylene and isobutylene with oxygen under conditions of controlled incomplete olefin oxidation in the temperature range of from about 300° to about 600° C. in the presence of a catalyst composition consisting essentially of an oxide of a metal of the left-hand column of Group VI of the Periodic System of the Elements, an oxide of bismuth in an amount corresponding to from about 1 to about 20 bismuth atoms per 10 atoms of said Group VI metal, and an oxide of arsenic in an amount corresponding to from about 0.1 to about 6 atoms of arsenic per 10 atoms of said Group VI metal.

2. The process in accordance with claim 1 wherein said catalyst also contains an oxide of an element selected from the group consisting of phosphorous, boron, silicon, and mixtures thereof, in an amount corresponding to from 0.5 to 5 atoms per 10 atoms of said Group VI metal.

3. The process in accordance with claim 1 wherein up to 50 atomic percent of the bismuth is substituted by a metal selected from the group consisting of silver, manganese, tin, lead and mixtures thereof.

4. The process in accordance with claim 1 wherein said catalyst is employed in combination with a catalyst support.

References Cited

UNITED STATES PATENTS 2,941,007  6/1960  Callahan et al. _____ 260—604

LEON ZITVER, *Primary Examiner.*

R. H. LILES, *Assistant Examiner.*